United States Patent
Van Lieshout et al.

(10) Patent No.: US 9,173,226 B2
(45) Date of Patent: Oct. 27, 2015

(54) NETWORK ELEMENT, WIRELESS COMMUNICATION UNITS AND METHODS FOR SCHEDULING COMMUNICATIONS

(75) Inventors: Gert-Jan Van Lieshout, Apeldoorn (NL); Himke Van Der Velde, Zwoile (NL); Kyeong In Jeong, Hwasoeng-si (KR)

(73) Assignee: Samsung Electronics Co., Ltd (KR)

( * ) Notice: Subject to any disclaimer, the term of this patent is extended or adjusted under 35 U.S.C. 154(b) by 489 days.

(21) Appl. No.: 13/390,266

(22) PCT Filed: Aug. 9, 2010

(86) PCT No.: PCT/KR2010/005199
§ 371 (c)(1),
(2), (4) Date: May 11, 2012

(87) PCT Pub. No.: WO2011/019172
PCT Pub. Date: Feb. 17, 2011

(65) Prior Publication Data
US 2012/0213142 A1   Aug. 23, 2012

(30) Foreign Application Priority Data
Aug. 11, 2009   (GB) .................................. 0914000.5

(51) Int. Cl.
*H04W 72/12* (2009.01)
*H04W 8/06* (2009.01)
(Continued)

(52) U.S. Cl.
CPC .............. *H04W 72/121* (2013.01); *H04W 4/08* (2013.01); *H04W 8/06* (2013.01); *H04W 72/005* (2013.01)

(58) Field of Classification Search
CPC .................................................... H04W 72/121
USPC .......... 370/311–318, 328, 329, 370; 455/434, 455/450, 458
See application file for complete search history.

(56) References Cited

U.S. PATENT DOCUMENTS 8,265,007 B2 * 9/2012 Lee et al. ...................... 370/328
8,270,345 B2 * 9/2012 Franceschini et al. ........ 370/328
(Continued)

FOREIGN PATENT DOCUMENTS

| KR | 100663423   | 12/2006 |
| KR | 100888426   | 3/2009  |
| KR | 1020090055599 | 6/2009 |

OTHER PUBLICATIONS

PCT/ISA/237 Written Opinion issued on PCT/KR2010/005199 (pp. 7).
(Continued)

*Primary Examiner* — Andrew Lai
*Assistant Examiner* — Andrew C Lee
(74) *Attorney, Agent, or Firm* — The Farrell Law Firm, P.C.

(57) ABSTRACT

A method for scheduling multimedia broadcast and multicast service (MBMS) transmissions in radio frames comprising subframes comprises receiving a plurality of different multimedia broadcast and multicast service (MBMS) user data for broadcasting to a plurality of wireless communication units. The method further comprises scheduling the different MBMS user data for broadcasting in respective subframes within a first radio frame; and scheduling a different subframe order of the different MBMS user data for broadcasting in respective subframes within a second radio frame wherein the varied subframe order is based on the MBMS service to be broadcast.

17 Claims, 10 Drawing Sheets

(51) Int. Cl.
*H04W 4/08* (2009.01)
*H04W 72/00* (2009.01)

(56) References Cited

U.S. PATENT DOCUMENTS

| | | | | |
|---|---|---|---|---|
| 8,351,467 | B2* | 1/2013 | Cheng et al. | 370/480 |
| 8,498,277 | B2* | 7/2013 | Lee et al. | 370/338 |
| 2004/0029596 | A1* | 2/2004 | Kim et al. | 455/458 |
| 2004/0087320 | A1* | 5/2004 | Kim et al. | 455/458 |
| 2004/0105402 | A1* | 6/2004 | Yi et al. | 370/312 |
| 2005/0153715 | A1* | 7/2005 | Hwang et al. | 455/458 |
| 2005/0169205 | A1* | 8/2005 | Grilli et al. | 370/313 |
| 2005/0190712 | A1* | 9/2005 | Lee et al. | 370/312 |
| 2005/0195852 | A1* | 9/2005 | Vayanos et al. | 370/437 |
| 2005/0201366 | A1* | 9/2005 | Kim et al. | 370/353 |
| 2006/0067289 | A1* | 3/2006 | Lee et al. | 370/338 |
| 2006/0209870 | A1* | 9/2006 | Lee et al. | 370/432 |
| 2007/0190967 | A1* | 8/2007 | Cho et al. | 455/403 |
| 2008/0045228 | A1* | 2/2008 | Zhang et al. | 455/450 |
| 2008/0101334 | A1* | 5/2008 | Bakker et al. | 370/350 |
| 2008/0170557 | A1* | 7/2008 | Yin | 370/343 |
| 2008/0274759 | A1* | 11/2008 | Chen et al. | 455/507 |
| 2009/0010255 | A1* | 1/2009 | Kim et al. | 370/389 |
| 2009/0046617 | A1* | 2/2009 | Tenny et al. | 370/312 |
| 2009/0047942 | A1* | 2/2009 | Cao | 455/422.1 |
| 2009/0180414 | A1* | 7/2009 | Maeda et al. | 370/311 |
| 2009/0286468 | A1* | 11/2009 | Kim et al. | 455/3.03 |
| 2009/0316811 | A1* | 12/2009 | Maeda et al. | 375/260 |
| 2010/0009687 | A1* | 1/2010 | Koivisto et al. | 455/450 |
| 2010/0011273 | A1* | 1/2010 | Parolari | 714/749 |
| 2010/0046451 | A1* | 2/2010 | Tada et al. | 370/329 |
| 2010/0105405 | A1* | 4/2010 | Vujcic | 455/452.1 |
| 2010/0110958 | A1* | 5/2010 | Racz et al. | 370/312 |
| 2010/0128646 | A1* | 5/2010 | Gao | 370/312 |
| 2010/0165901 | A1* | 7/2010 | Kim | 370/312 |
| 2011/0002276 | A1* | 1/2011 | Chen et al. | 370/329 |
| 2011/0044223 | A1* | 2/2011 | Kim et al. | 370/312 |

OTHER PUBLICATIONS

PCT/ISA/210 Search Report issued on PCT/KR2010/005199 (pp. 4).

* cited by examiner

FIG. 9

```
                                                                                    900
-    Extract from 6.3.1: System information blocks
-- Alternative a) Session list per PMCH; FFS, DP#4a
MBSFNAreaConfiguration-A ::=           SEQUENCE {
    mbms-SessionList                   MBMS-SessionList-A,
    nonCriticalExtension               SEQUENCE {}              OPTIONAL
}
MBMS-SessionList-A ::=                 SEQUENCE (SIZE (1..maxPMCH-PerMBSFN)) OF MBMS-SessionPerPMCH
MBMS-SessionPerPMCH ::=                SEQUENCE {
    pmch-Config                        PMCH-Config,
    mbms-SessionListPerPMCH            MBMS-SessionListPerPMCH
}
MBMS-SessionListPerPMCH ::=            SEQUENCE (SIZE (1..maxSessionPerPMCH)) OF MBMS-SessionInfo-A
    MBMS-SessionInfo-A ::=             SEQUENCE {
        serviceId                      MBMS-ServiceId,
        sessionId                      OCTET STRING (SIZE (1)),
        mtch-Config                    SEQUENCE {
            -- pdcp-Config is FFS i.e. specified config may be used
            -- rlc-Config is FFS i.e. specified config may be used
            logicalChannelId           INTEGER (0)          -- Value range is FFS
        },
        ...
}

-- Alternative b) Complete session list with reference to seperate pmch-Config; FFS, DP#4b
MBSFNAreaConfiguration-B ::=           SEQUENCE {
    pmch-ConfigList                    PMCH-ConfigList,
    mbms-SessionList                   MBMS-SessionList-B,
    ...
}

PMCH-ConfigList ::=                    SEQUENCE (SIZE (1..maxPMCH-PerMBSFN)) OF PMCH-Config
MBMS-SessionList-B ::=                 SEQUENCE (SIZE (1..maxSession)) OF MBMS-SessionInfo-B
MBMS-SessionList-B ::=                 SEQUENCE {
    serviceId                          MBMS-ServiceId,
    sessionId                          OCTET STRING (SIZE (1)),
    mtch-Config                        SEQUENCE {
        -- pdcp-Config is FFS i.e. specified config may be used
        -- rlc-Config is FFS i.e. specified config may be used
        logicalChannelId               INTEGER (0)          -- Value range is FFS
    },
    ...
}
-- Common definitions
PMCH-Config ::=                        SEQUENCE {
    msap-Config                        SEQUENCE {},          -- Details are FFS
    hoppingScheme                      CHOICE { {
        release                        NULL,
        setup                          SEQUENCE {
            hoppingScheme    ENUMERATED {scheme1, scheme2, scheme3, scheme4}-- Value range is FFS
        }
    },
    modulationAndCodingScheme          INTEGER (0),         -- Value range is FFS
    msap-Occasion                      SEQUENCE {
        periodicity                    ENUMERATED {},       -- value range is FFS
        position                       ENUMERATED {}        -- FFS if start/ duration/ end is used
                                                            -- value range is FFS
}
```

NETWORK ELEMENT, WIRELESS COMMUNICATION UNITS AND METHODS FOR SCHEDULING COMMUNICATIONS

PRIORITY

This application claims priority to International Patent Appl. No. PCT/KR2010/005199 filed Aug. 9, 2010, and to United Kingdom Patent Application No. 0914000.5 filed Aug. 11, 2009, the disclosure of each of which is incorporated herein by reference.

TECHNICAL FIELD

The field of this invention relates to a network element, wireless communication units and method for scheduling communications. The invention is applicable to, but not limited to, use of service hopping to minimise conflicts between reception of multimedia broadcast and multicast service (MBMS) and measurement gaps.

BACKGROUND ART

In order to provide enhanced communication services, 3rd generation cellular communication systems are designed to support a variety of different and enhanced services. One such enhanced service, named multimedia broadcast and multicast services (MBMS), has been proposed for introduction into release 9 (REL-9) of the Evolved Universal Terrestrial Radio Access (E-UTRA) standard, which is currently being defined. Examples of MBMS services and applications include multimedia broadcast, e.g. mobile television, audio, streamed video, etc. Some multimedia services require a high bandwidth due to the nature of the data content that is to be communicated, such as video streaming. Some multimedia services may only require a low bandwidth due to the nature of the data content that is to be communicated, such as news services. Typically, tens of channels carrying say, news, movies, sports, etc. may be broadcast simultaneously over a MBMS communication network.

Within the defined MBMS operation of Rel-9 of E-UTRA, a single radio transmission mode may be used, termed multicast broadcast single frequency network (MBSFN). In this point-to-multipoint (PTM) transmission mode of operation, multiple communication cells synchronously transmit the same MBMS content in their respective service areas. The area covered by the participating communicating cells of such a synchronised transmission is referred to as the 'MSFSN' area. Synchronous transmission of the same MBMS content is achieved by a central network entity, termed the Multi-cell/multicast Coordination Entity (MCE), which is configured to decide both the radio resources that are used for the MBSFN transmission as well as the details of the radio resource configuration, i.e. the layer-1/layer-2 (L1/L2) configuration parameters to be used.

A communication cell may participate in MBMS transmissions corresponding to different MBSFN areas, in which case MBSFN areas overlap. The radio transmission area of MBMS user data is the same as that used for the corresponding control information, i.e. the cells that participate in the transfer of the user data also participate in the transfer of the corresponding control information.

Within an MBMS service area, it is known that single frequency networks (SFN) may be employed. The allocation of subframes for MBSFN communication is complicated, involving several levels of communication protocol elements:

(i) Subframe Pool Reserved for Future use (SP-RF): This protocol element/field indicates sub-frames used in post release 8 systems, for new features such as MBSFN. The sub-frames indicated by the SP-RF, signalled via the Broadcast Control Channel (BCCH), are not relevant for REL-8 UEs. The SP-RF, specified by the field mbsfn-SubframeConfigList in SystemInformationBlockType2 (also referred to as SIB2), is defined by means of a list of Subframe Allocation Patterns (hereafter referred to as SIB2 SAPs).

(ii) MBSFN area specific Common Subframe Pool (CSP): This protocol element/field indicates which of the subframes indicated by the SP-RF are used for MBSFN. In case multiple MBSFN areas are used, the CSP needs to be defined for each of the MBSFN areas. These subframe allocations are referred to as the Common Subframe Pool (CSP), since they are common for all the multicast channels (MCHs) that are configured for a particular MBSFN area, i.e. each MCH uses a subset of the CSP.

(iii) MCH Subframe Allocation Pattern (MSAP): The allocation of radio resources to an (P)MCH is specified by means of an MCH Subframe Allocation Pattern (MSAP) i.e. the MSAP protocol element/field defines those subframes within a given periodic cycle that are allocated to a specific (physical) multicast transport channel ((P)MCH). At the time of filing this patent application, the details of the MSAP signalling have not yet been finalised.

(iv) MCH Dynamic Service Scheduling: This protocol element/field, which is provided per (P)MCH, indicates those subframes that are used for each of the services that are scheduled. E-UTRAN provides this information to the UE at the start of each scheduling period. The scheduling period is also referred to as an 'MSAP occasion'. It should be noted that, within an MSAP occasion, all user data corresponding to an MBMS service is scheduled in 'subsequent subframes'; i.e. subsequent when only considering the subset of subframes that are allocated to the concerned (P)MCH. Hence, for each service that is scheduled, E-UTRAN just needs to provide an indication of the start and the duration. At the time of filing this patent application, the details of the MSAP signalling have not yet been agreed. However, the duration of the MSAP occasion values that has been discussed is either 320 msec. or 640 msec.

MBMS technology is designed to transmit data traffic from a content server (often referred to as a data source) to multiple destination user terminals/user equipment (UEs) in a 3GPP cellular/mobile communication system. In order to achieve efficient transmission, two delivery modes have been defined for MBMS delivery in 3GPP mobile communication systems: point-to-multipoint (p-t-m) and point-to-point (p-t-p).

The decision of the delivery mode is made at a network controller, based on the number of UEs/users that have activated the particular MBMS service in the coverage area of the network controller. If the number of UEs that have activated the service is larger than a pre-set threshold value, p-t-m transmission is selected and used. Otherwise, the service is delivered in an uni-cast (i.e. point-to-point) manner, where a dedicated radio bearer to a particular UE is provided. This selection is made in order to optimise the efficiency of delivering the MBMS data content according to the number of participating users. In an uni-cast mode of operation, the E-UTRAN is aware of those services that each UE is receiving.

However, in contrast to the uni-cast mode, EUTRAN is generally not aware of the MBMS services that the UE is receiving. This implies that additional procedures need to be defined by which EUTRAN can determine or estimate the number of UEs that are interested to receive the MBMS service (sometimes referred to as a 'counting procedure'). It has been agreed that the MBMS solution for release 9 will not include such kind of procedures. Consequently, release 9 only employs p-t-m transfer using MBSFN with a semi-static MBSFN area. Even if additional procedures are defined in later releases, p-t-m transfer mode is assumed to remain the typical and most cost-effective approach for the provision of multimedia services. However, with multicast/broadcast communications transmission/reception conflicts may exist, as described below.

In the field of 3GPP MBMS systems, the E-UTRA has been designed such that the E-UTRAN is able to configure a UE in a radio resource control (RRC) connected state, referred to as 'RRC_CONNECTED'. In this state, the UE is configured to perform radio frequency measurements on:

(i) the frequency channel used by its serving communication cell, (ii) other E-UTRA frequencies (referred to as inter-frequency measurements) and/or (iii) frequencies used by other Radio Access Technologies (referred to as inter-RAT measurements).

Since UEs typically employ a single transceiver, it is not possible to perform inter-frequency and inter-RAT measurements, whilst the UE is engaged in (unicast) data transmission with the serving cell, as the transceiver is fully occupied in its uni-cast communications on a particular frequency channel. To overcome this, the E-UTRAN in 3GPP has been designed to configure periods in which it does not schedule any downlink data transfer. During these periodically appearing discontinuous reception (DRx) periods, also referred to as 'measurement gaps', the UE is able to perform the required measurements on other frequency channels, as detailed in (i)-(iii) above.

An example measurement gap configuration is illustrated in the timing diagram 100 of FIG. 1. Eight radio frames 105, 110, 115 up to 120 are shown. Each radio frame comprises ten sub-frames. As illustrated, a first subset 125 of radio frame '0' 105, comprising six sub-frames is allocated for communicating prior to a 'measurement gap' 130 that comprises a gap of 6 msec. (i.e. 6 sub-frames). The current standard defines the repetition period of the 'measurement gap' as appearing either every 40 msec. or 80 msec. (i.e. every '4' or '8' radio frames), with an offset specifying the position within this gap period.

A perceived problem in the use of measurement gaps in an MBMS context, particularly when MBSFN is employed in a number of MBMS areas, is potential conflicts between the measurement gaps and MBMS service reception.

To clarify this, let us consider a scenario where two MBSFN areas are used, as shown in the timing diagram 200 of FIG. 2. A set of subframes 225 are allocated to a first MBSFN area that employs two transport channels, MCHa and MCHb. For the first MBSFN area, a first set of subframes 227 is allocated to the first transport channel MCHa comprising sub-frame '3' 215 and sub-frame '8' 220 in the first four radio frames 205 and a second set of subframes 232 is allocated to the second transport channel MCHb comprising a use of sub-frame '3' 215 and sub-frame '8' 220 in the next four radio frames. The remaining eight radio frames 230 in the sequence of sixteen radio frames are employed by the second MBSFN area MBSFN-2.

Let us also consider a scenario whereby five MBMS services are mapped to the first transport channel MCHa 227 and dynamic scheduling information is provided every thirty two radio frames.

Currently, within the MBMS standard, the MBMS services are scheduled according to a pre-defined scheme, which is configured semi-statically. More specifically, it has been agreed that the MBMS services are scheduled in the order in which they are listed on the multicast control channel (MCCH). This means that in every scheduling period, the first multicast transport channel MTCH-1 235 appears first, followed by the second multicast transport channel MTCH-2 240, and so on. This predefined order is beneficial for UEs that did not manage to receive the scheduling information.

For example, let us suppose that a first UE is only interested to receive the second multicast transport channel MTCH-2 240. If the first UE did not manage to receive the scheduling information from the MCCH, in principle the first UE then has to receive all subframes that are used for MCHa 227. However, when the UE detects a subframe in which MTCH-3 245 is scheduled, the first UE knows that any following subframes are not used for MTCH-2 240. Hence, the UE is able to stop reception until the next scheduling period. This feature is termed 'early termination'. Furthermore, the UE is able to derive the MBMS service that the data corresponds to from the medium access control (MAC) header information (in particular from the logical channel identity).

Thus, systematic conflicts may exist between measurement gaps 130 of FIG. 1 and MBMS reception, for example in transport channels 215, 220. For example, a UE may be configured with a measurement gap 130 starting with sub-frame '6' of the first radio frame of a set of eight radio frames, as illustrated in FIG. 1. If the same UE is interested to receive the MBMS service corresponding with MTCH-1 235 in FIG. 2, in every set of 32 radio frames, there is a conflict with one of the four measurement gaps that is configured for broadcast during this period, i.e. once every eight radio frames. If, however, the UE was interested to receive the MBMS service corresponding with MTCH-2 240 there would not be any conflict, as the MTCH-2 240 transmission does not conflict with the defined repetitions of the measurement gap. The same applies for MTCH-3 245, MTCH-5 255.

It is generally assumed that mobility measurements should take precedence over MBMS reception. Consequently, when there is a conflict between the two the UE will be unable to receive a part of the user data of the MBMS service. The impact of this depends on the service characteristics and the upper layer mechanism configured to overcome losses.

DISCLOSURE OF INVENTION

Technical Problem

As shown by the above example, some services may be hit by the measurement gaps whilst others are not affected at all. The unequal, and UE specific, distribution of MBMS service losses implies that a mechanism to overcome this needs to be dimensioned for a worst case scenario. For example, MBMS service loss may be overcome by providing additional protection or UE-specific repair options at upper layers, such as at the end of the service transmission. However, this may result in additional overhead and/or delay. Furthermore, this approach to providing additional protection or UE-specific repair options may not be feasible for the streaming type of MBMS services. The repeated loss of a particular MBMS service causes unfair degradation only to certain users. For such cases, it would be desirable to distribute the MBMS service losses more equally between the different UEs.

Thus, a need exists for an improved mechanism to minimise conflict between MBMS service reception and measurement gaps introduced into the scheduled communications applicable for a particular UE.

Solution to Problem

Accordingly, the invention seeks to mitigate, alleviate or eliminate one or more of the above mentioned disadvantages singly or in any combination. Aspects of the invention provide a network entity, such as a MCE, a network element, such as an eNB, a wireless communication unit, such as a UE, and associated integrated circuits, methods and computer program products to support MBMS service hopping to prevent systematic conflicts between an MBMS service reception and measurement gaps applicable for a wireless communication unit, as described in the appended claims.

According to a first aspect of the invention, there is provided a method for scheduling multimedia broadcast and multicast service (MBMS) transmissions in radio frames comprising subframes. The method comprises receiving a plurality of different multimedia broadcast and multicast service (MBMS) user data for broadcasting to a plurality of wireless communication units; scheduling MBMS user data for broadcasting in respective subframes within a first scheduling period; and scheduling MBMS user data for the same MBMS service to employ a different starting subframe within a second scheduling period.

In this manner, a method for scheduling multimedia broadcast and multicast service (MBMS) transmissions is described where the scheduling may prevent or minimise systematic overlap between the subframes used to broadcast an MBMS service and the subframes allocated to an individual UE for performing measurements.

According to an optional feature of the invention, scheduling the different starting subframe for the same MBMS service within a second scheduling period may comprise scheduling the different starting subframe based on the MBMS service to be broadcast. In this manner, the schedule may be adapted according to the MBMS service to be broadcast.

According to an optional feature of the invention, scheduling the different starting subframe for the same MBMS service within a second scheduling period may comprise scheduling according to at least one from a group of: shifting the starting subframe for the same MBMS service; re-positioning one or more of the subframes for the same MBMS service within the second scheduling period. In this manner, the different starting subframe can be configured by shifting the starting subframe within a plurality of subframes, for example in a circular shift manner, and/or re-positioning subframes.

According to an optional feature of the invention, scheduling the different starting subframe for the same MBMS service within a second scheduling period may comprise scheduling a plurality of MBMS services of which the same MBMS service is a subset thereof according to a predefined service hopping pattern. In this manner, it may be possible to only shift a subset of MBMS services, from within the plurality of MBMS services, to prevent a service that is more susceptible to conflicts from being affected.

According to an optional feature of the invention, the method may further comprise initially determining whether or not to implement a service hopping pattern to be used in delivering multimedia services and selectively scheduling the MBMS service in response to a positive determination. In this manner, it may be possible to selectively apply the service hopping schedule, for example according to the prevailing communication conditions.

According to an optional feature of the invention, the pre-defined service hopping pattern may be apriori known to the plurality of wireless communication units. In this manner, the pre-defined service hopping pattern that is used may be standardised, and thus known to all communication units.

According to an optional feature of the invention, the method may further comprise signalling to a broadcast network element and the plurality of wireless communication units the predefined service hopping pattern that is to be used in delivering multimedia services. In this manner, the pre-defined service hopping pattern that is used may be dynamically modified and signalled to all communication units, thereby introducing more flexibility into the scheduling process.

According to an optional feature of the invention, signalling to the plurality of wireless communication units may comprise signalling the predefined service hopping pattern to the plurality of wireless communication units in a radio resource control message on a MBMS control channel. In this manner, the pre-defined service hopping pattern that is used may be signalled from the network entity to all communication units.

According to an optional feature of the invention, signalling to the broadcast network element may comprise signalling the pre-defined pattern to the broadcast network element upon a re-configuration of the predefined service hopping pattern. In this manner, the pre-defined service hopping pattern that is used may be signalled when it is updated, thereby reducing the signalling required.

According to an optional feature of the invention, signalling to the plurality of wireless communication units may comprise at least one from a group of: signalling the pre-defined service hopping pattern to the plurality of wireless communication units information at the start of each scheduling period, thereby indicating a position of a respective MBMS service that is scheduled during the scheduling period<; signalling periodically the predefined service hopping pattern to the plurality of wireless communication units information as part of multicast broadcast single frequency network control information. In this manner, the pre-defined service hopping pattern that is used may be signalled at a start of each scheduling period, thereby enabling the wireless communication units to determine speedily whether the MBMS service is of interest.

According to an optional feature of the invention the service hopping pattern may be indicated to the network element, but not indicated to the plurality of wireless communication units. In accordance with this optional feature, the network element provides the 'normal scheduling information' at each scheduling period to the plurality of wireless communication units.

According to an optional feature of the invention, scheduling of a different starting subframe for the same MBMS service may be performed using at least one from the following group: changing a starting position of the service hopping schedule of MBMS services in a round robin approach, changing a starting position of the service hopping schedule of MBMS services within a group round robin approach, shifting a start position of each MBMS service within respective scheduling periods. In this manner, a variety of mechanisms for performing the service hopping schedule may be used.

According to an optional feature of the invention, the method may further comprise indicating that a different starting subframe for the same MBMS service may be used for broadcasting in respective subframes within a second scheduling period by adopting at least one from a group of: allocating a field on a control channel as being optional, such that service hopping is applied if the field is determined as being present on a signalling channel; assigning at least one bit on a signalling channel. In this manner, more flexibility and control of a dynamic service hopping schedule can be achieved.

According to an optional feature of the invention, the method may further comprise indicating that a different starting subframe for the same MBMS service is to be used by assigning the at least one bit in a particular field on the signalling channel.

According to an optional, alternative feature of the invention, the method may further comprise sending a MBMS session start message to a broadcast network element to indicate a start of multimedia content delivery and supplementing the MBMS session start message with a service hopping pattern according to the different starting subframe within a second scheduling period. In this manner, the introduction of a dynamic service hopping schedule into an existing MBMS session start message can be readily achieved.

According to an optional feature of the invention, the subframes allocated for the same MBMS service for a wireless communication unit may be arranged to not be consistently time-coincident with subframes allocated to the same wireless communication unit for performing radio frequency signal measurements. In this manner, it may be possible to schedule MBMS services to prevent or minimise conflicts.

According to a second aspect of the invention, there is provided a computer program product comprising executable program code for scheduling multimedia broadcast and multicast service (MBMS) transmissions in radio frames comprising subframes. The computer program product comprises program code operable for: receiving a plurality of different multimedia broadcast and multicast service (MBMS) user data for broadcasting to a plurality of wireless communication units; scheduling MBMS user data for broadcasting in respective subframes within a first scheduling period; and scheduling a different starting subframe for the same MBMS service for broadcasting in respective subframes within a second scheduling period.

According to a third aspect of the invention, there is provided a network entity for scheduling multimedia broadcast and multicast service (MBMS) transmissions in radio frames comprising subframes. The network entity comprises a signal processing module arranged to: receive a plurality of different multimedia broadcast and multicast service (MBMS) user data for broadcasting to a plurality of wireless communication units; schedule MBMS user data for broadcasting in respective subframes within a first scheduling period; and schedule MBMS user data for the same MBMS service to employ a different starting subframe within a second scheduling period. According to an optional feature of the invention, the network entity may be a Multi-cell/multicast Coordination Entity (MCE).

According to a fourth aspect of the invention, there is provided an integrated circuit for a network entity for scheduling multimedia broadcast and multicast service (MBMS) transmissions in radio frames comprising subframes. The integrated circuit comprises a signal processing module arranged to: receive a plurality of different multimedia broadcast and multicast service (MBMS) user data for broadcasting to a plurality of wireless communication units; schedule MBMS user data for broadcasting in respective subframes within a first scheduling period; and schedule MBMS user data for the same MBMS service to employ a different starting subframe within a second scheduling period.

According to a fifth aspect of the invention, there is provided a method for scheduling multimedia broadcast and multicast service (MBMS) transmissions in radio frames comprising subframes. The method comprises receiving a plurality of different multimedia broadcast and multicast service (MBMS) user data; receiving scheduling information of a plurality of different multimedia broadcast and multicast service (MBMS) user data wherein a first order of MBMS user data is scheduled for broadcasting in respective subframes within a first scheduling period; and a different starting subframe within a second scheduling period is scheduled for the same MBMS service; and broadcasting the same MBMS service to a plurality of wireless communication units according to the scheduling information.

According to a sixth aspect of the invention, there is provided a computer program product comprising executable program code for scheduling multimedia broadcast and multicast service (MBMS) transmissions in radio frames comprising subframes. The computer program product comprises program code operable for: receiving a plurality of different multimedia broadcast and multicast service (MBMS) user data; receiving scheduling information of a plurality of different multimedia broadcast and multicast service (MBMS) user data wherein a first order of MBMS user data is scheduled for broadcasting in respective subframes within a first scheduling period; and a different starting subframe within a second scheduling period is scheduled for the same MBMS service; and broadcasting the same MBMS service to a plurality of wireless communication units according to the scheduling information.

According to a seventh aspect of the invention, there is provided a wireless broadcast network element for scheduling multimedia broadcast and multicast service (MBMS) transmissions in radio frames comprising subframes. The wireless broadcast network element comprises a multicast data handler module arranged to: receive a plurality of different multimedia broadcast and multicast service (MBMS) user data; receive scheduling information of a plurality of different multimedia broadcast and multicast service (MBMS) user data wherein a first order of MBMS user data is scheduled for broadcasting in respective subframes within a first scheduling period; and a different starting subframe within a second scheduling period is scheduled for the same MBMS service; and a transceiver arranged to broadcast the same MBMS service to a plurality of wireless communication units according to the scheduling information.

According to an optional feature of the invention, the multicast data handler may be configured to buffer the MBMS user data for a scheduling period and then re-order the user data in accordance with the scheduling information. According to an optional feature of the invention, the multicast data handler may be further arranged to discard any excess data that may not fit within the second scheduling period. In this manner, a network entity may be able to distribute the discarding of excess data across multiple MBMS services.

According to an optional feature of the invention, the wireless broadcast network element may comprise at least one of: a base transceiver station, a Node B, an evolved Node B.

According to an eighth aspect of the invention, there is provided an integrated circuit for a wireless broadcast network element for scheduling multimedia broadcast and multicast service (MBMS) transmissions in radio frames comprising subframes. The integrated circuit may comprise a signal processing module arranged to: receive a plurality of different multimedia broadcast and multicast service (MBMS) user data for broadcasting to a plurality of wireless communication units; receive scheduling information of a plurality of different multimedia broadcast and multicast service (MBMS) user data, wherein MBMS user data is scheduled for respective subframes within a first scheduling period; and wherein user data for the same MBMS service is scheduled for a different starting subframe within a second scheduling period.

According to a ninth aspect of the invention, there is provided a method for receiving scheduled multimedia broadcast and multicast service (MBMS) transmissions in radio frames comprising subframes. The method comprises: receiving scheduling information of a plurality of different multimedia broadcast and multicast service (MBMS) user data wherein MBMS user data is scheduled for respective subframes within a first scheduling period; and wherein user data for the same MBMS service is scheduled for a different starting subframe within a second scheduling period; receiving multimedia broadcast and multicast service (MBMS) user data from the plurality of different multimedia broadcast and multicast service (MBMS) user data in response to the received scheduling information.

According to a tenth aspect of the invention, there is provided a computer program product comprising executable program code for receiving multimedia broadcast and multicast service (MBMS) transmissions in radio frames comprising subframes. The computer program product comprises program code operable for: receiving scheduling information of a plurality of different multimedia broadcast and multicast service (MBMS) user data wherein MBMS user data is scheduled for respective subframes within a first scheduling period; and wherein user data for the same MBMS service is scheduled for a different starting subframe within a second scheduling period; receiving multimedia broadcast and multicast service (MBMS) user data from the plurality of different multimedia broadcast and multicast service (MBMS) user data in response to the received scheduling information.

According to an eleventh aspect of the invention, there is provided a wireless communication unit for receiving multimedia broadcast and multicast service (MBMS) transmissions in radio frames comprising subframes. The wireless communication unit comprises a receiver arranged to receive: a plurality of multimedia broadcast and multicast service (MBMS) user data; and scheduling information of a plurality of different multimedia broadcast and multicast service (MBMS) user data, and a signal processing module operably coupled to the receiver and arranged to process the scheduling information and determine that a first service hopping schedule of MBMS user data is scheduled to be broadcast in respective subframes within a first scheduling period; and a different starting subframe within a second scheduling period is scheduled for the same MBMS service; such that the signal processing module processes the first scheduling period and second scheduling period of MBMS user data to receive user data related to the same MBMS service.

According to an optional feature of the invention, the signal processing module may be further arranged to determine from an order in which the MBMS services are listed on a received control channel, and decoding the service hopping pattern, whether or not the desired MBMS service will be scheduled in a later sub-frame. According to an optional feature of the invention, the signal processing module may be further arranged to terminate reception of a multicast transport channel when the receiver receives a MBMS service that is not desired and is scheduled to be broadcast following the service it is interested to receive according to the scheduled order of broadcast MBMS user data. In this manner, the wireless communication unit may be able to initiate early termination of receiving the MBMS services or the multicast control channel, thereby saving power.

According to an optional feature of the invention, the signal processing module may be further arranged to derive which MBMS service is scheduled from a formula based on a counter that increments with each scheduling period. According to an optional feature of the invention, the counter may be based on a system frame number (SFN) of the received multimedia broadcast and multicast service (MBMS) user data. In this manner, the wireless communication unit may be able to more readily calculate a location of a desired MBMS service.

According to a twelfth aspect of the invention, there is provided an integrated circuit for a wireless communication unit for receiving multimedia broadcast and multicast service (MBMS) transmissions in radio frames comprising subframes. The integrated circuit comprises a receiver arranged to receive: a plurality of different multimedia broadcast and multicast service (MBMS) user data; and scheduling information of a plurality of different multimedia broadcast and multicast service (MBMS) user data, a signal processing module operably coupled to the receiver and arranged to process the scheduling information and determine that a first order of MBMS user data is scheduled to be broadcast in respective subframes within a first scheduling period; and a different starting subframe within a second scheduling period is scheduled for the same MBMS service; such that the signal processing module processes the first scheduling period and second scheduling period of MBMS user data to receive user data related to the same MBMS service.

These and other aspects of the invention will be apparent from, and elucidated with reference to, the embodiments described hereinafter.

Advantageous Effects of Invention

The present invention provide a network entity, such as a MCE, a network element, such as an eNB, a wireless communication unit, such as a UE, and associated integrated circuits, methods and computer program products to support MBMS service hopping to prevent systematic conflicts between an MBMS service reception and measurement gaps applicable for a wireless communication unit, as described in the appended claims.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 9 illustrates an example ASN.1 on modifying the configuration options using a service hopping scheme.

MODE FOR THE INVENTION

Examples of the invention will be described in terms of a multicast broadcast single frequency network (MBSFN) area supporting a multimedia broadcast and multicast service (MBMS) communications for release-9 of EUTRAN in the 3GPP standard. However, it will be appreciated by a skilled artisan that the inventive concept herein described may be embodied in any type of radio access system that employs a broadcast and/or multicast transmission in which the radio access network (RAN) is not aware of the services that the UE is receiving and the radio access network requires provision of specific periods of time, such as periods of measurement gaps to relay real-time information back to the network. For example, embodiments described herein may also be applied to a communication system that supports single cell point-to-multipoint/broadcast transmissions. In particular, the proposed mechanism concerns a network element, a wireless communication unit (such as a UE) and a method for preventing or minimising systematic overlap between the subframes used to broadcast an MBMS service and the subframes allocated to an individual UE for performing measurements.

In the context of the present invention, the term 'broadcast service', hereinafter used, is meant to encompass at least both of the following definitions of service, as defined in the UMTS specification:

(i) Broadcast Service: a unidirectional point-to-point service in which data is efficiently transmitted from a single source to multiple UEs in the associated broadcast service area. Broadcast services may be received by all users who have enabled the specific broadcast service locally on their UE and who are in the broadcast area defined for the service.

(ii) Multicast service: a unidirectional point-to-multipoint service in which data is transmitted efficiently from a single source to a multicast group in the associated Multicast service area. A Multicast service may only be received by such users that are subscribed to the specific multicast service and have joined the multicast group associated with the specific service.

Figure 1:
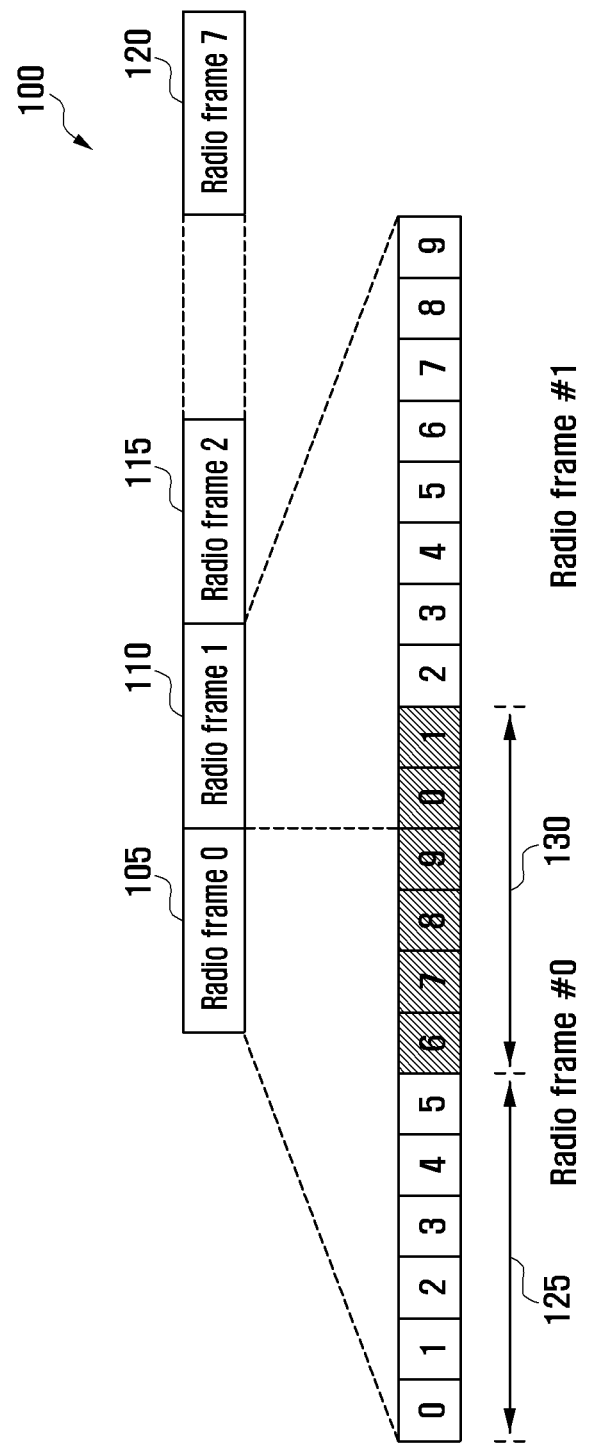
FIG. 1 illustrates a frame structure supporting measurement gap periods.
Figure 2:
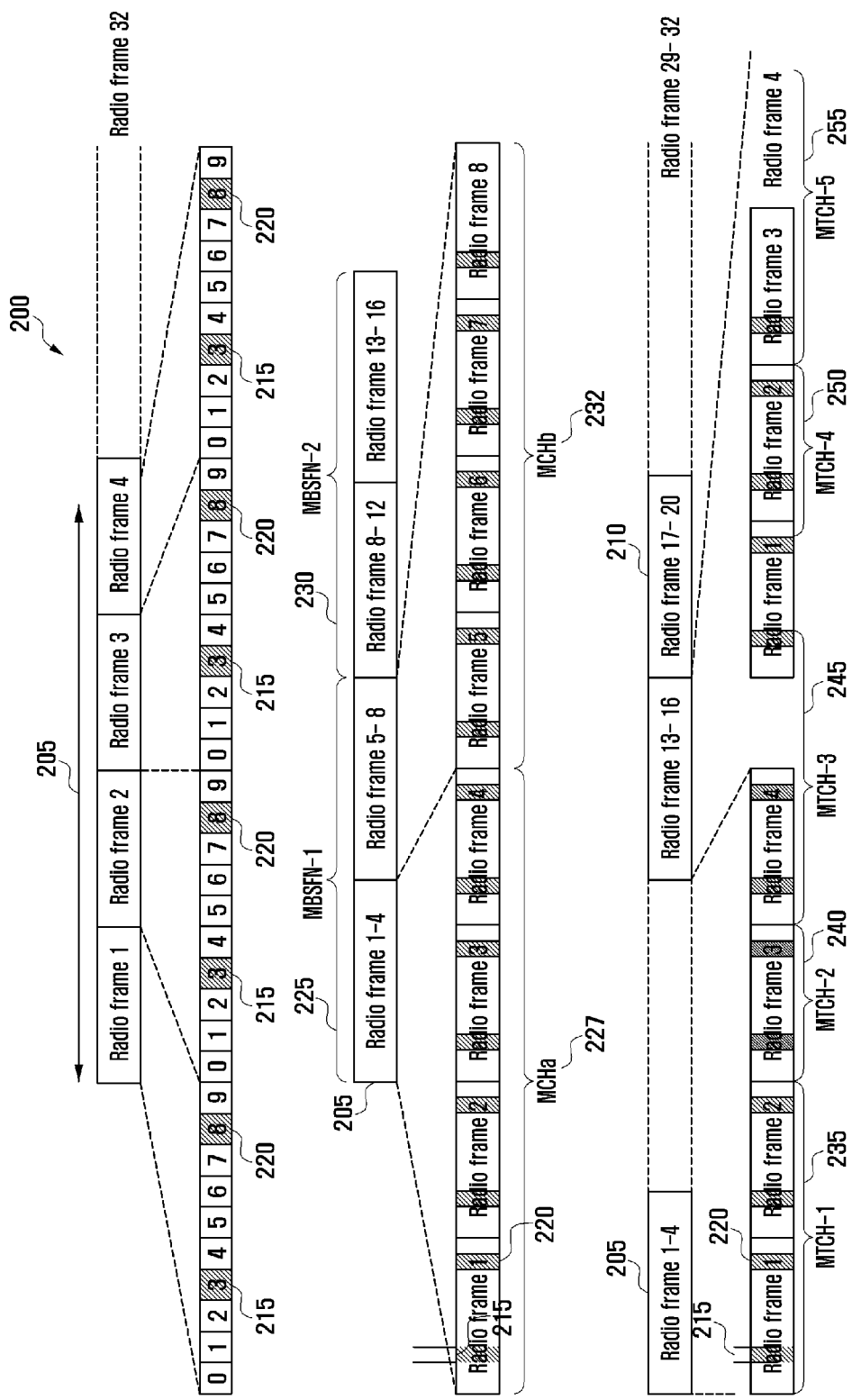
FIG. 2 illustrates dynamic service scheduling for two multicast transport channels in a scenario where two MBSFN areas are supported.
Figure 3:
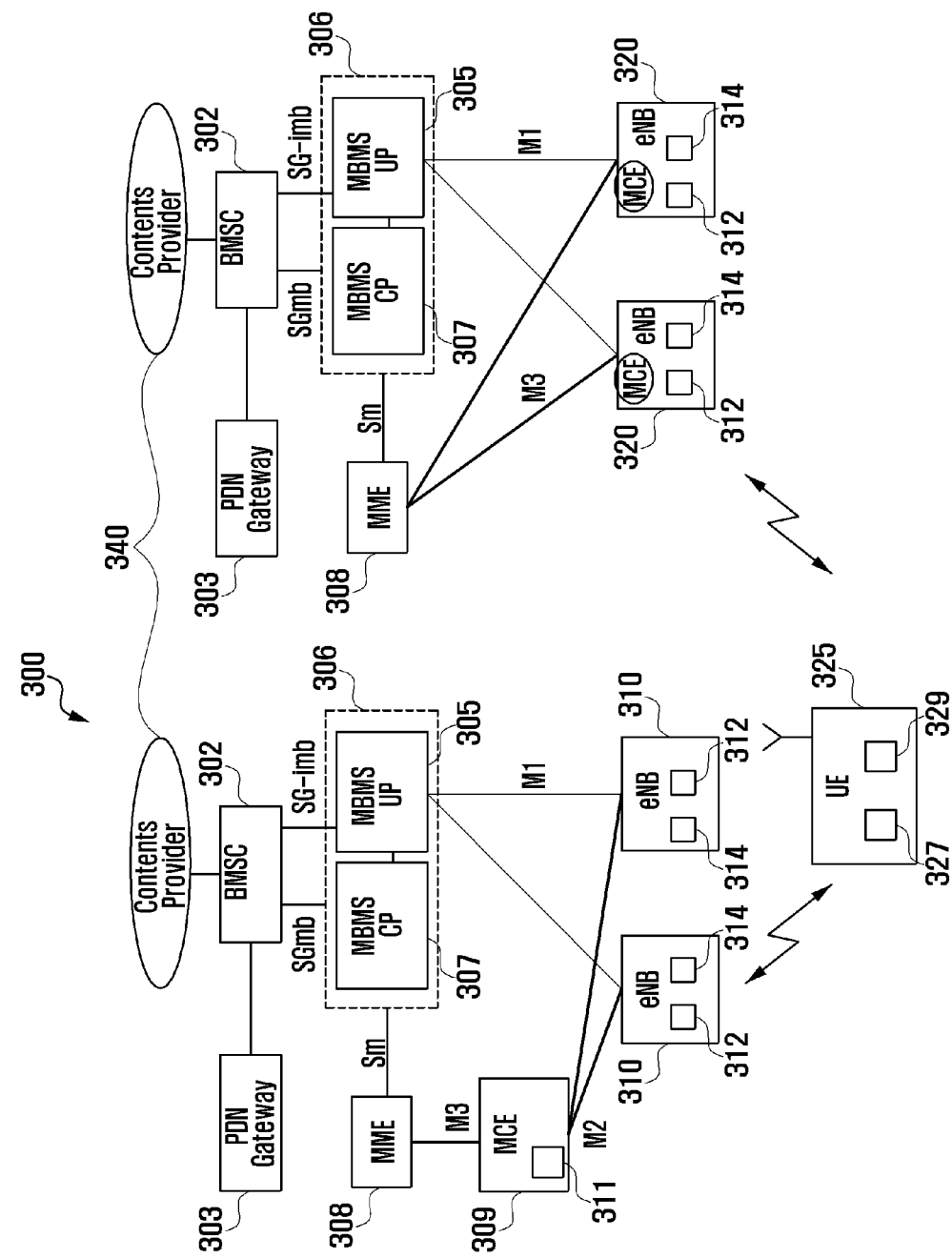
FIG. 3 illustrates an exemplary overview of a wireless communication system adapted in accordance with some embodiments of the invention.

Referring now to FIG. 3, a wireless communication system 300 is shown in outline, in accordance with one example embodiment of the invention. In this example embodiment, the wireless communication system 300 is compliant with, and contains network elements capable of supporting MBMS broadcasts over an Evolved-UMTS terrestrial RAN (E-UTRAN) wireless communication system air-interface, which is currently under discussion and standardisation within 3GPP. This is also referred to as Long Term Evolution (LTE).

The architecture consists of radio access network (RAN) and core network (CN) elements. In an MBMS context, the CN elements comprise content providers 340 that provide multimedia content to users via a broadcast multimedia service centre BMSC 302. The BMSC 302 is also coupled to a packet data network (PDN) gateway 303, to enable users to access multimedia content via, say, the Internet as compared to a specialised content provider 340. As illustrated in FIG. 3, the BMSC 302 is operably coupled to MBMS GW 306 that comprises modules 305, 307 that handle MBMS user plane (UP) data and MBMS control plane (CP) data. The primary component of the RAN is an eNodeB (an evolved NodeB) 310, 320, which functions as a base transceiver station and is directly connected to the CN via a M1 interface and to the UEs 325 via an Uu interface. The eNodeB 310, 320 controls and manages the radio resource related functions in an unicast mode, whereas an MCE performs such control in MBMS. The series of Node Bs 310, 320 also perform lower layer processing for the network, performing such functions as Medium Access Control (MAC), formatting blocks of data for transmission and physically transmitting transport blocks to UEs 325.

The CN has two main components: a serving aGW (serving access gateway) (not shown as it is involved only with unicast data) and mobility management entity (MME) 308. The serving-aGW controls the U-plane (user-plane) communication, where the management of traffic delivery is managed by the serving-aGW for radio resource control (RRC) RRC_Connected users. The MME 308 controls the c-plane (control plane) communication, where the user mobility, bearer establishment, and quality of service (QoS) support are handled by the MME 308. The E-UTRA RAN is based on orthogonal frequency division multiple access (OFDMA) in downlink (DL) communications and single carrier frequency division multiple access (SC-FDMA) in uplink (UL) communications. The high level description of the EUTRA radio interface (stage 2) can be found in TS 36.300; please refer to: http://www.3gpp.org/specification. The eNode Bs 310 are connected wirelessly to the UEs 325. Each eNode-B contains one or more transceiver units 312 operably coupled to respective signal processing logic 314. Similarly, each of the UEs comprise transceiver unit 327 operably coupled to signal processing logic 329 (with one UE illustrated in such detail for clarity purposes only) and communicate with the eNode B supporting communication in their respective location area. The system comprises many other UEs and eNode-Bs, which for clarity purposes are not shown.

In accordance with one example embodiment of the invention, a mechanism for varying a starting position of user data according to a service hopping schedule of the multimedia services to be broadcast to the UEs is provided. The mechanism is provided as part of the dynamic scheduling used for MBMS content delivery and part of the implementation may be performed in signal processing module 311 of MCE 309. In one example, the varying of the starting position of the service hopping schedule of user data according to a service hopping schedule of the multimedia services to be broadcast to the UEs may follow a predefined pattern, known to the UEs. In this example, the pre-defined pattern may encompass a general rule that covers all scheduling periods. This may be signalled to the UEs as part of the overall MBSFN control information on the main control channel (MCCH), which is transmitted periodically. In this regard, whenever there is a change of a parameter on MCCH, the UE may be notified that is has to re-acquire the entire MCCH control information, including the modified pre-defined pattern. In one example, the pre-defined pattern may only be signalled to eNBs when the pattern needs to be reconfigured or at every session start.

Thus, in the example where a predefined pattern is used and is known to the UEs, the use of the pre-defined pattern has the advantage that a UE 325 that has missed the scheduling information is still able to terminate MCH reception early. For example, the signal processing module 329 of the UE 325 is able to terminate MCH reception early when it receives a service (within the scheduling period according to the pre-defined pattern) that is not desired and is scheduled to be broadcast following the service it is interested to receive.

Thus, the signal processing module 329 of the UE 325 is able to recognise that receiving and decoding subsequent subframes within that scheduling period has minimal value and therefore terminates MCH reception early. In this manner, the benefit of the known early termination procedure may be maintained by pre-defining a service hopping schedule and informing the UE of the schedule. If no such service hopping schedule is defined, and the UE did not manage to receive the scheduling information, the UE has to continue to receive and decode all subframes of the concerned MCH until the end of the scheduling period unless it detects the MBMS service that it is interested to receive, in which case it can stop upon detecting a subsequent subframe in which another service is scheduled.

In one example, the MCCH may be terminated in the eNB 310. In an alternative example, the MCCH may be terminated in the MCE 309.

In a further example, the varying of the service hopping schedule of the multimedia services to be broadcast to the UEs may follow a pattern that may be configured by, for example, signal processing module 311 of MCE 309, or may be defined in the standard specification, for example TS 36.331, which is not MBMS specific but for the layer 3/radio control protocol. In examples hereinafter described, the varying of the hopping schedule in which the MBMS services are scheduled to be broadcast to a plurality of UEs enables the data loss for a particular MBMS service, due to conflict between multimedia reception and a provision of measurement gaps to relay measurement data to the E-UTRAN, to be distributed, thereby reducing the possibility of any conflict between MBMS reception and the measurement gaps that is applicable for a given UE 325. In this further example, the signal processing module 311 of MCE 309 indicates the service hopping pattern to all participating eNBs. In this manner, the MCE 309, for example signal processing module 311 of MCE 309, is able to vary the starting position of user data according to the service hopping schedule in any arbitrary manner (so long as the same scheduling is applied by all participating eNBs) not known to the UE.

In one example, the service hopping schedule may be configured to not follow a predefined hopping pattern, or at least the UE is not informed about the predefined hopping pattern as all eNBs still have to hop consistently.

Again, if the MBMS services are scheduled according to a pre-defined service hopping pattern, namely the starting position of user data according to the service hopping schedule in which the services are listed on the MCCH, the signal processing module 329 of the UE 325 will be able to determine, following receiving a particular sub-frame and decoding the pre-defined service hopping pattern, whether or not the desired MBMS service will be scheduled in a later sub-frame. If the desired MBMS service is scheduled for a later sub-frame, the signal processing module 329 of the UE 325 is able to decide whether or not to temporarily terminate reception for the remainder of the scheduling period (early termination), or continue reception for a relatively small period of time until the desired sub-frames are to be received. The EUTRAN normally indicates at the start of each scheduling period/MSAP occasion, which subframes are allocated to each of the MBMS services that are scheduled. Hence, this early termination feature only applies in a case where the UE did not manage to receive the dynamic scheduling information.

The eNB may receive more data than it is capable of transmitting to the UEs within a scheduling period. Thus, the eNB has to discard some user data, and typically discards the user data placed at the end of the buffer. In a further example, the user data placed last in the buffer is discarded when the multimedia services have been re-scheduled for broadcasting, e.g. after applying the variation of the starting position of user data according to the service hopping schedule. In this further example, any data loss due to a lack of space within the scheduling period is advantageously distributed between the different multimedia/MBMS services. In general, multimedia/MBMS services that are carried on the same MCH should have comparable Quality of Service (QoS) requirements. In a case where the QoS requirements are equal, distribution of the data loss, as in this further example, is beneficial. However, it is recognised that in cases where differences between the detailed QoS requirements of the MBMS services exist, it may be desirable to arrange for some of the multimedia/MBMS services to be never affected by the discarding operation. In such a case, it may be desirable to employ a group-based round robin scheme as shown in the second example of FIG. 5 below, where a first group of services are scheduled before a second group, to ensure that the first group would normally never be affected by the 'final discarding' operation and would be used to support services that do not tolerate data loss particularly well.

Figure 4:
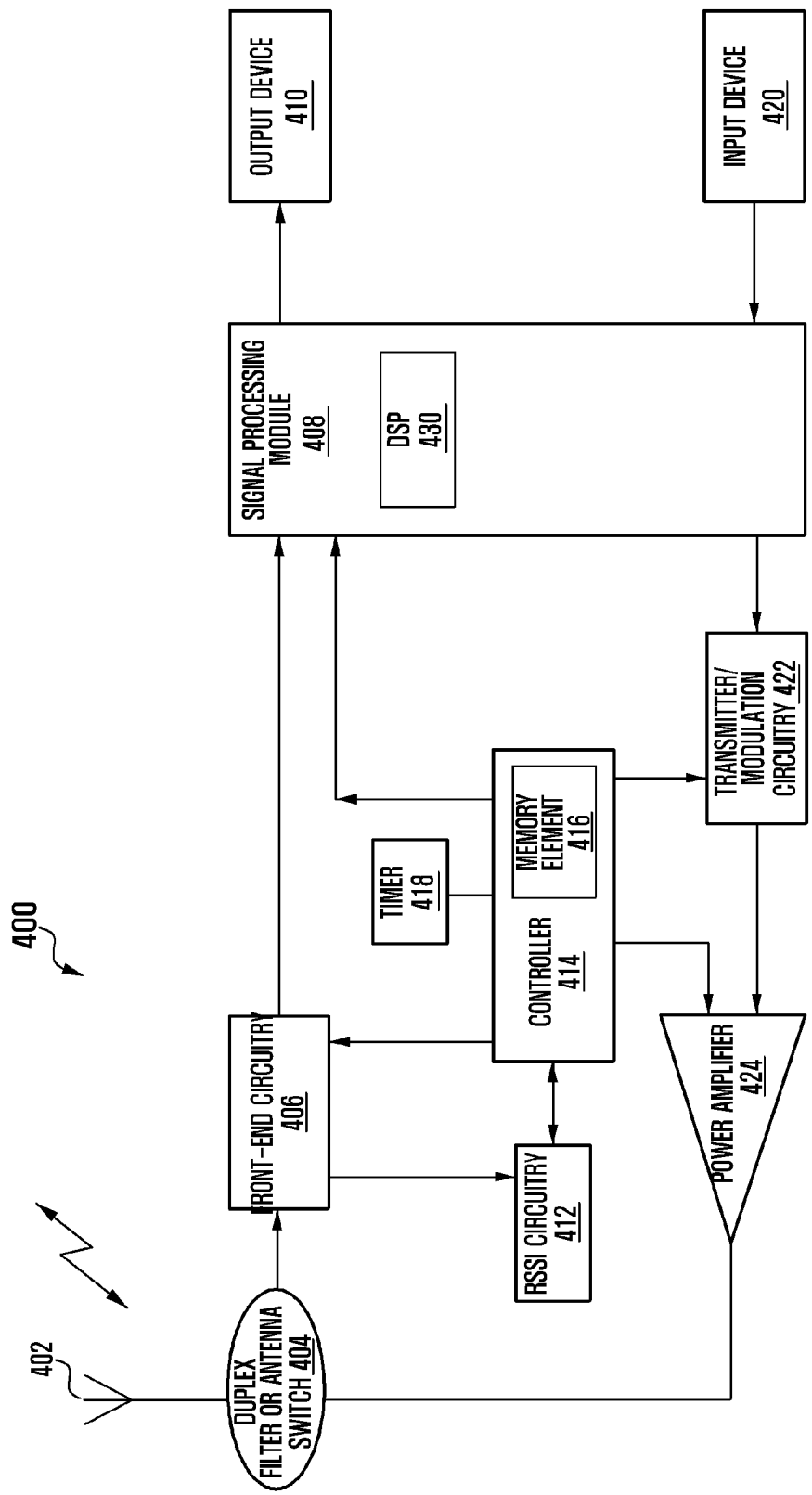
FIG. 4 illustrates a block diagram of a wireless communication unit adapted in accordance with some embodiments of the invention.

Referring now to FIG. 4, a simplified, example block diagram of a wireless communication unit 400 (sometimes referred to as a mobile subscriber unit (MS) in the context of cellular communications or user equipment (UE) in terms of a 3rd generation partnership project (3GPP) communication system) is shown, in accordance with an embodiment of the invention. The wireless communication unit 400 contains an antenna 402 preferably coupled to a duplex filter or antenna switch 404 that provides isolation between receive and transmit chains within the wireless communication unit 400.

The receiver chain, as known in the art, includes receiver front-end circuitry 406 (effectively providing reception, filtering and intermediate or base-band frequency conversion). The front-end circuitry 406 is serially coupled to a signal processing module 329. An output from the signal processing module 329 is provided to a suitable output device 410, such as a screen or flat panel display. The receiver chain also includes received signal strength indicator (RSSI) circuitry 412, which in turn is coupled to a controller 414 that maintains overall subscriber unit control. The controller 414 may therefore receive bit error rate (BER) or frame error rate (FER) data from recovered information. The controller 414 is also coupled to the receiver front-end circuitry 406 and the signal processing module 329 (generally realised by a digital signal processor (DSP)). The controller 414 is also coupled to a memory element 416 that may store operating regimes, such as decoding/encoding functions, synchronisation patterns, code sequences, RSSI data and the like. In accordance with examples of the invention, the memory element 416 stores service hopping scheduling information that details a varying (service hopping) delivery of multimedia/MBMS services, to be processed by signal processing module 329. Furthermore, a timer 418 is operably coupled to the controller 414 to control the timing of operations (transmission or reception of time-dependent signals) within the wireless communication unit 400, particularly with regard to receiving the scheduled MBMS services according to the predefined or received service hopping schedule.

As regards the transmit chain, this essentially includes an input device 420, such as a keypad, coupled in series through transmitter/modulation circuitry 422 and a power amplifier 324 to the antenna 402. The transmitter/modulation circuitry 422 and the power amplifier 424 are operationally responsive to the controller 414. The signal processing module 329 in the transmit chain may be implemented as distinct from the processor in the receive chain. Alternatively, a single processor may be used to implement processing of both transmit and receive signals, as shown in FIG. 4. Clearly, the various components within the wireless communication unit 400 can be realised in discrete or integrated component form, with an ultimate structure therefore being merely an application-specific or design selection.

In accordance with examples of the invention, receiver front-end circuitry 406, together with, and under the control and guidance of, the signal processing module 329, memory element 416, timer function 418 and controller 414 have been adapted to receive the scheduled MBMS services according to the predefined or received service hopping schedule, as described previously with respect to FIG. 3.

Figure 5:
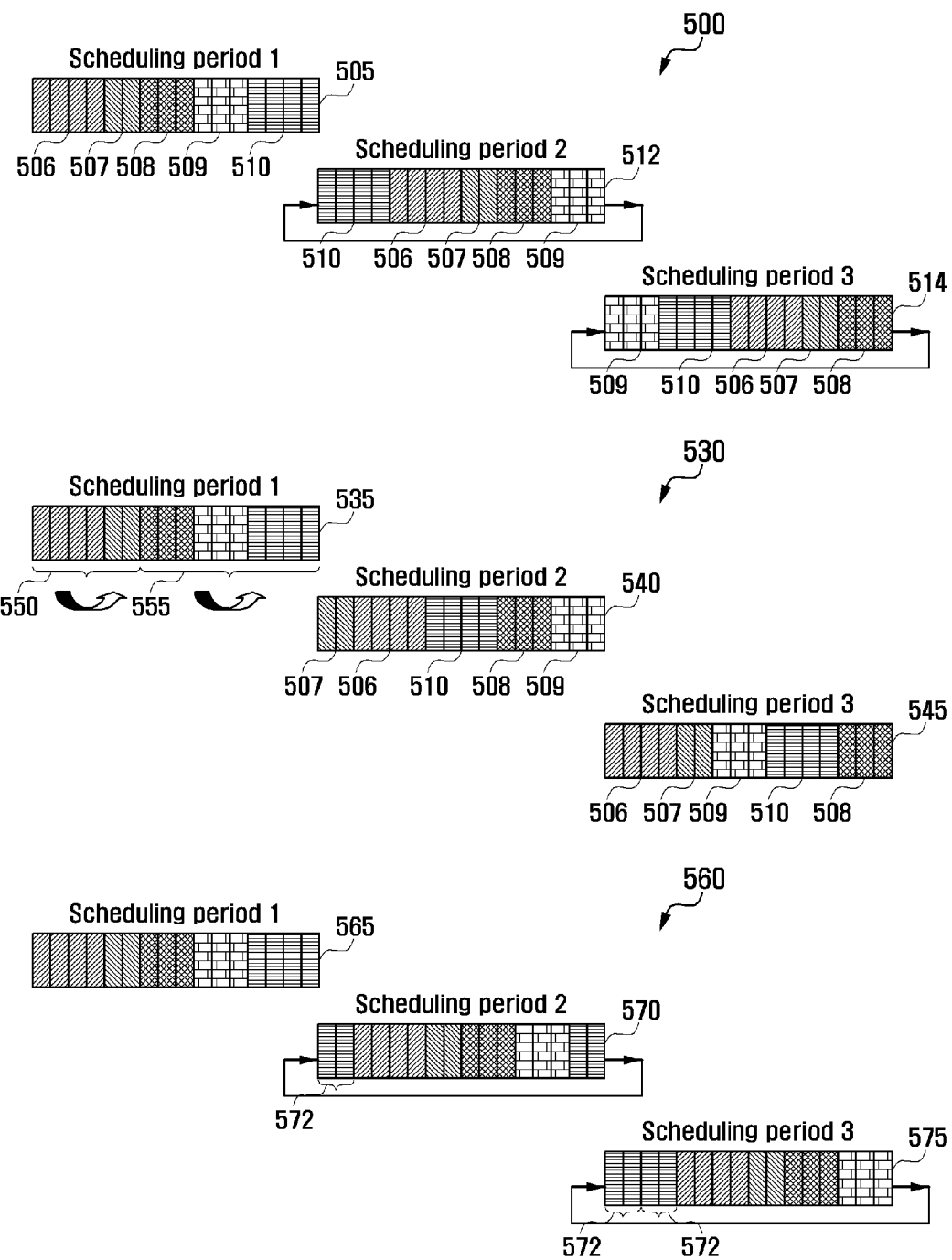
FIG. 5 illustrates various examples of MBMS service hopping schedules.

Referring now to FIG. 5, a series of timing diagrams is illustrated showing an exemplary distribution of multimedia/MBMS sub-frames to be broadcast to a wireless communication unit/UE. A first set of timing diagrams 500 illustrates an example of a round robin approach to distributing the subframes using a pre-defined service hopping pattern. In FIG. 5, the first scheduling period 505 comprises a first multicast broadcast channel carrying MBMS user data of a first MBMS service (MTCH-1) 506, followed by a second MTCH-2 507 carrying MBMS user data of a second MBMS service, a third MTCH-3 508 carrying MBMS user data of a third MBMS service, and so on. Implementing a round robin approach, the next scheduling period 512 following a varying of the starting position of user data according to the service hopping schedule of broadcast services according to the particular multimedia/MBMS service, commences with carrying MBMS user data of the fifth MBMS service MTCH-5 510 broadcast channel. This is followed by carrying MBMS user data of a first MBMS service MTCH-1 506, carrying MBMS user data of a second MBMS service MTCH-2 507, and so on, as shown. The next scheduling period 514 commences with carrying MBMS user data of the fourth MBMS service MTCH-4 509 broadcast channel, followed by carrying MBMS user data of the fifth MBMS service MTCH-5 510, carrying MBMS user data of the first MBMS service MTCH-1 506, and so on. In this manner, the UE is able to derive which service is scheduled first from a formula based on a counter that increments with each scheduling period, for example as given in formula [1] below:

$$\text{Service identity} = \text{Scheduling period count MOD Number of services} \qquad [1]$$

where:

Number of services is the number of services that are configured for the concerned (P)MCH. It should be noted that some of the configured services may not be scheduled in a particular scheduling period.

The scheduling period count can be based on a general system counter, for example the system frame number (SFN), as follows:

$$\text{Scheduling period count} = \text{SFN DIV scheduling period} \qquad [2]$$

with the scheduling period expressed as a number of radio frames.

The SFN currently has a value range up to 1024 (radio frames), meaning that when using a scheduling period of 32 (radio frames), the scheduling period counter could increase up to 32. In most cases this high value of the scheduling period counter is not a multiple of the number of services. In such cases, the resulting service hopping pattern is not entirely continuous, for example there may be a 'jump' every time the scheduling period count reverts back to '0'. This 'jump' is relatively infrequent, unless the high value of the scheduling period count is a rather low value.

In other examples, for example when supporting a larger number of multimedia/MBMS services on an MCH, such as '64' or '128', the ratio of scheduling period to a range for the scheduling period counter would need to be adjusted accordingly. In one example to support this, the system counter that is used could be a larger value range than currently defined for the SFN, for example by providing for a general extension of the SFN.

In a yet further example, the service hopping information may be configured to not depend on the actual number of service. Thus, in this example, the service hopping information may not need to be exchanged at every session start.

Referring back to FIG. 5, a further timing illustration shows an example using a group-based round robin scheme 530. In the group-based round robin scheme 530 sub-sets of multimedia/MBMS services are used. For example, the sub-sets of multimedia/MBMS services used may have equal quality of service (QoS) requirements. In the illustrated example, let us consider a first group/sub-set 550 that includes MTCH-1 506 and MTCH-2 507 and a second group/sub-set 555 that includes MTCH-3 508, MTCH-4 509 and MTCH-5 210. The service hopping variation is now performed only within the respective group/sub-set. For example, as illustrated, in the first scheduling period 535 MTCH-1 506 carrying MBMS user data of a first MBMS service is scheduled first, followed by MTCH-2 507 carrying MBMS user data of a second MBMS service and so on up to MTCH-5 510 carrying MBMS user data of a fifth MBMS service. In the second scheduling period 540, MTCH-2 507 carrying MBMS user data of the second MBMS service is scheduled first, followed by MTCH-1 506 carrying MBMS user data of the first MBMS service, MTCH-5 510 carrying MBMS user data of the fifth MBMS service, MTCH-3 508 carrying MBMS user data of the third MBMS service and MTCH-4 509 carrying MBMS user data of the fourth MBMS service. In the third scheduling period 545, MTCH-1 506 carrying MBMS user data of the first MBMS service is again scheduled first, followed by MTCH-2 507 carrying MBMS user data of the second MBMS service, with the second group also being rotated with MTCH-4 509 carrying MBMS user data of the fourth MBMS service following next and thereafter MTCH-5 510 carrying MBMS user data of the fifth MBMS service and MTCH-3 508 carrying MBMS user data of the third MBMS service.

FIG. 5 illustrates a yet further example using a dynamic scheduling mechanism employing multimedia/MBMS service start hopping 560. In the yet further example, instead of modifying the starting position of user data according to the service hopping schedule of MBMS services as illustrated in the previous group-based example 530, the same effect can be achieved by shifting the start position of each multimedia/MBMS service within each scheduling period. Thus, in the context of examples and embodiments of the invention, the term 'service hopping' is considered as encompassing at least a service order change, which in this example encompasses a time shift in a start of one or more MBMS services.

This approach is illustrated by means of the same example as that previously used, for example with five multimedia/MBMS services being supported. In this example a subframe is used entirely by one multimedia/MBMS service. Also, in this particular example, the number of subframes used by each multimedia/MBMS service is the same in each scheduling period. In this example, the start of the multimedia/MBMS services is shifted two subframes to the right each scheduling period. Although, in this example, the start position of each multimedia/MBMS service is shifted by two subframes within each scheduling period, the start position may be shifted by any other number of subframes in alternative examples.

The shifting is performed in a circular manner for example when a shift is performed the last two subframes move to the start. Hence, in the first scheduling period 565 comprises a first multicast broadcast channel (MTCH-1) 506 carrying MBMS user data of the first multimedia/MBMS service, followed by the second MTCH-2 507 carrying multimedia/ MBMS user data of the second multimedia/MBMS service, the third MTCH-3 508 carrying MBMS user data of the third multimedia/MBMS service and so on. The second scheduling period 570 comprises the last two subframes of the fifth MTCH-5 510, transferred to the beginning of the scheduling period 570. The remaining subframes are shifted by two locations (subframe time periods), as shown. The third scheduling period 575 again comprises the last two subframes (in effect what was previously the first two subframes of the fifth MTCH-5 510), transferred to the beginning of the scheduling period 575. The remaining subframes are again shifted by two locations (subframe time periods), as shown.

Let us consider a further example of this subframe (circular) shift mechanism, where a shift/step size (Nsh) of, say, 3 subframes is used upon each iteration. Furthermore, let us further consider that within one scheduling period 25 subframes are allocated to the concerned MCH (Nasf). Since Nasf may not always be a multiple of Nsh, the pattern may only repeat after the Nasf scheduling periods. In this example, one possible formula for clarifying the scheduling could be:

$$Shift=((Csp\ DIV\ Nasf)*Nsh)MOD\ Nsh$$

with Csp being the (aforementioned) scheduling period count, i.e. a number that is incremented each scheduling period.

In a further example, the MCE may be configured to selectively operate a number of options on whether or not to implement a dynamic, service hopping scheduling mechanism. One example used to support such options is:

Option 1: No configuration information is signalled to the eNB or UE by the MCE, for example in a scenario where service hopping is always configured and according to a hopping pattern that is specified in a standard (e.g. using a fixed service hopping pattern).

Option 2: A bit is assigned on the MCCH, by the MCE (as the MCE decides the actual setting of all the MCCH information (since it has to be the same for all participating eNBs)), to indicate whether or not service hopping applies. If service hopping applies, it is configured according to a MBMS service hopping pattern that is specified in a standard (i.e. a fixed pattern).

Option 3: A bit is assigned on the MCCH by the MCE to indicate whether or not service hopping applies. Furthermore, a field in the MCCH indicates a particular service hopping pattern that applies. Thus, in option 3, each value of the MBMS service hopping pattern field corresponds with a specific MBMS service hopping pattern. The MBMS messages are currently still under discussion. A provisional draft ASN.1 900 has been modified, as shown in FIG. 9, to illustrate how the configuration options could be added by means of a field hopping Scheme, in accordance with option 3, for example adopting an on (setup)/off (release) option in combination with a field indicating which hopping scheme/pattern applies, as illustrated in FIG. 9. In EUTRA, the specification of the contents of a message is performed by means of an ASN.1 specification.

Option 4: A field on the MCCH is made optional, in which case service hopping is applied by the eNB only if the field is present. Note that the same signalling approach may actually be followed from the eNB to the UE.

Figure 6:
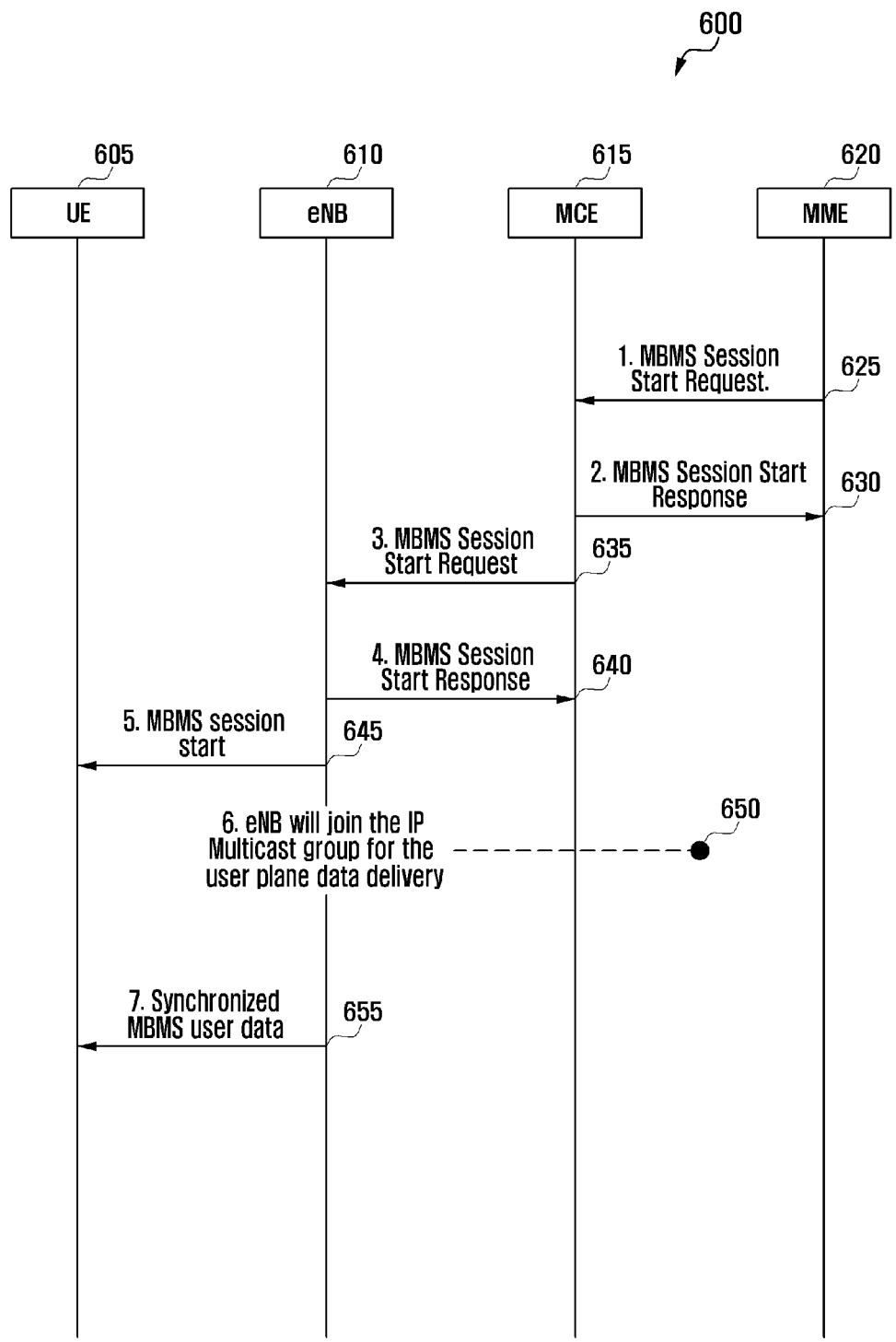
FIG. 6 illustrates a message sequence chart detailing an example session start procedure.

Referring now to FIG. 6, a message sequence chart 600 illustrates an exemplary form of messaging that may be employed to start a MBMS session. The elements involved in the MBMS session start process comprise a UE 605, an eNB 610, an MCE 615 and an MME 620. The message sequence chart 600 commences with the MME 620 sending an MBMS session start request message to the MCE(s) 615 that control the eNBs 610 in the targeted MBMS service area, as shown in step 625. In one example, the message includes the IP multicast address and session attributes related to the MBMS session. Next, in step 630, the MCE 615 confirms the reception of the MBMS Session Start request to the MME 620. After confirming the reception of the MBMS Session Start request to the MME 620, the MCE 615 then transmits an MBMS Session Start message in step 635 to the one or more eNBs 610 in the targeted MBMS/MBSFN service area. In one example, the MCE 615 that is responsible for coordinating the use of the radio resources to achieve synchronous transmissions for MBSFN on the radio interface, supplements the MBMS Session Start message with the aforementioned service hopping scheduling information, if any. The MCE 615 then sends the configuration information to the one or more eNBs in step 635.

In addition to the MBMS session attributes, message 635 may provide radio bearer configuration for MBSFN transmission. The one or more eNBs then confirm(s) the reception of the MBMS Session Start message to the MCE 615 in step 640. In an alternative example, step 630 may be implemented after step 640. Next, in step 645, the one or more eNBs 610 send(s) the MBMS Session Start message, together with the service hopping scheduling information, to UEs 605. At some subsequent time, the one or more eNBs join(s) the IP multicast group to receive the MBMS User Plane data, as shown in step 650. Finally, the eNB(s) send(s) the MBMS data to the appropriate radio interface at the determined time, and according to the MBMS service hopping schedule dictated by MCE 615, so that the MBMS user data can be sent to the one or more UEs for synchronised reception, as shown in step 655.

Thus, in this manner, the user plane data is not affected by the MBMS service hopping, other than within the one or more eNBs 610 where the actual scheduling operation is performed. Furthermore, in some examples, the processing module of the UE may be adapted to configure the UE operation in accordance with the actual service hopping pattern that is used.

Figure 7:
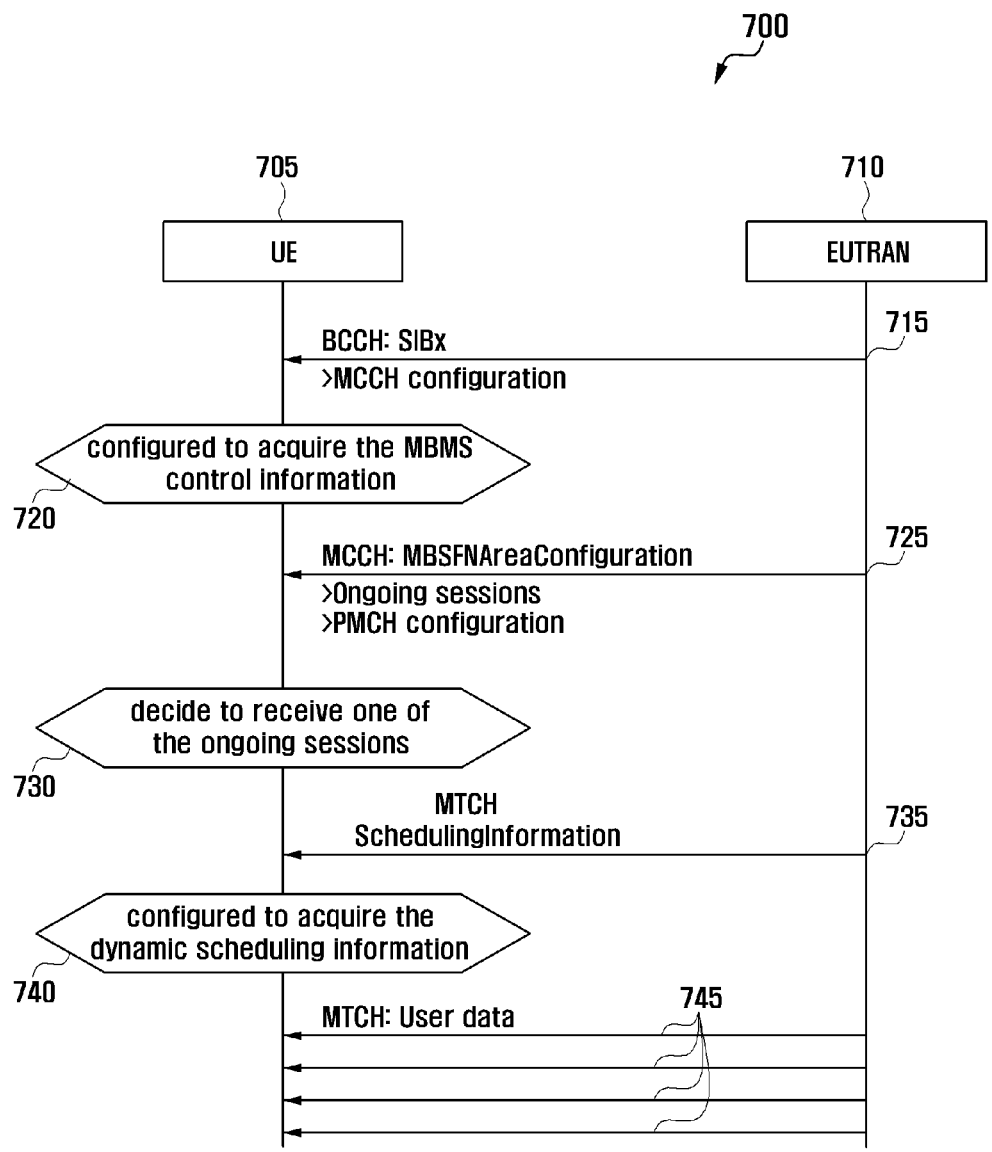
FIG. 7 illustrates a message sequence chart detailing an example operation of a UE.

Referring now to FIG. 7, a message sequence chart 700 illustrates an example operation of an adapted UE 705. The UE 705 receives communications from entities within the EUTRAN 710, for example service hopping scheduling information from an MCE via one or more of the aforementioned serving eNBs. The message sequence chart 700 commences in step 715 with the UE 705 first acquiring the MBMS control information from the BCCH broadcast by the one or more eNBs. The MBMS control information is primarily concerned with information required to acquire the MCCH, e.g. the sub-frames used to transfer the MCCH, as well as the MCCH repetition and modification periods. The UE 705 may also acquire the information regarding those subframes that are reserved for future use, as specified by the field 'mbsfn-SubframeConfigList' in SIB2. Next, the UE 705 acquires the MBMS control information from the MCCH in order to determine whether there is an on-going session of any of the MBMS services that the UE is interested in receiving.

In one example embodiment, the UE may not always be required to periodically monitor the MCCH in order to detect, for example, a start of a session of an MBMS service. Instead, the EUTRAN 710 may notify the UE 705 whenever it should acquire the MCCH. In other example embodiments, the UE 705 may be required to (periodically) acquire the MCCH, for example whilst receiving an MBMS session, upon UE mobility, as in some exceptional cases. The list of ongoing services may be indicated by a field mbms-SessionList within the MBSFNAreaConfiguration message. The field also indicates on which PMCH the service is provided, as well as logical-ChannelId that identifies the session within the scope of the (P)MCH. The MBSFNAreaConfiguration message may also include the aforementioned configuration options on whether the service hopping is used and possibly an indication of the predefined service hopping pattern used if the option has been selected.

If the UE decides to receive one of the ongoing sessions, it acquires the further details regarding the radio resource configuration applicable for the service. Thus, simultaneous reception of multiple services is not precluded. In this case, the UE determines those subframes that are allocated to the (P)MCH. The UE may also obtain the dynamic scheduling configuration, which primarily indicates the frequency and the position of the scheduling information, applicable for an (P)MCH, as provided by EUTRAN. In this example, EUTRAN may be configured to provide to the UE the dynamic scheduling configuration, for example indicate the start position of each MBMS service/MTCH, thereby avoiding any change to the scheduling information itself.

In step 740, at the start of each dynamic scheduling period, the UE may be configured to acquire the dynamic scheduling information that indicates which of the subframes allocated to the PMCH are allocated to the specific MBMS service(s) that the UE is interested to receive. This provides the opportunity for the UE to reduce power consumption, for example the UE may then be configured to enter a form of 'sleep mode' during those subframes supporting MBMS services that the UE is not interested in receiving (depending on whether unicast reception is ongoing in parallel).

Finally, for each dynamic scheduling period, the UE 705 receives in step 745 the subframes corresponding to the MTCH user data for the MBMS session that the UE is interested in receiving. In cases where the UE 705 did not obtain the dynamic scheduling information in step 735, the UE 705 should receive all subframes from the start of the dynamic scheduling period. The UE 705 may terminate the subsequent receiving of subframes if the UE 705 detects a MBMS service that, according to the pre-defined scheduling of the starting position of user data according to a service hopping schedule applicable for this dynamic scheduling period, is scheduled after the MBMS service(s) that the UE is interested in receiving.

Figure 8:
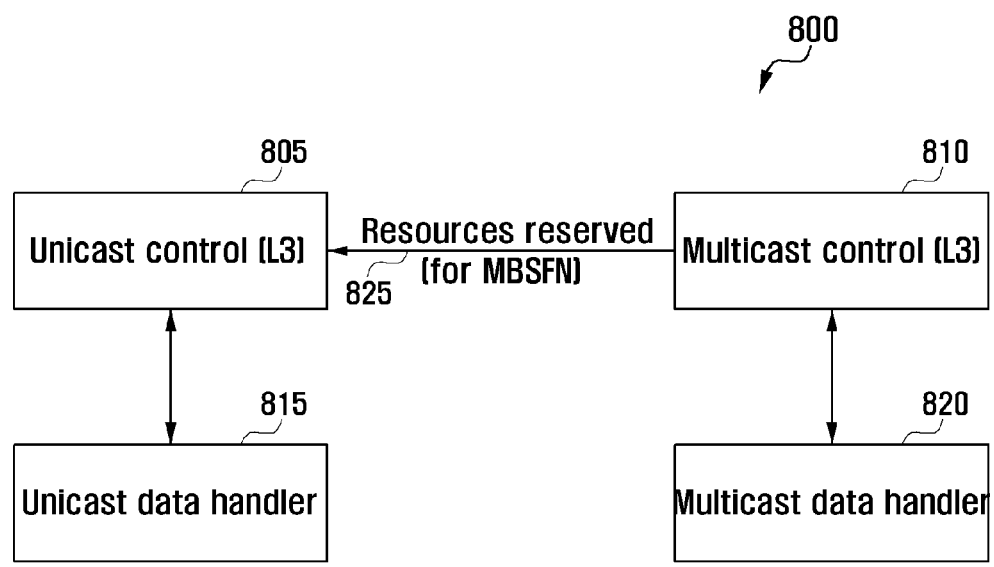
FIG. 8 illustrates an example functional block diagram of an eNB.

Referring now to FIG. 8, a very high level functional block diagram 800 of an adapted eNB is illustrated. The very high level functional block diagram 800 comprises separate processing modules to support uni-cast control layer-3 (L3) 805 and an adapted multicast control layer-3 810. Furthermore, separate processing modules are shown to support uni-cast layer-1 user data handling (L1/L2) 815 and an adapted multicast layer-1 user data handling (L1/L2) 820. Although the example in FIG. 8 highlights a distinction between the processing modules related to unicast data transfer and those related to multicast data transfer (MBMS), it is envisaged in some examples that the same processing module in the eNB may be used.

In example embodiments, the multicast data handler 820 is configured to buffer the user data for a scheduling period. The multicast data handler 820 then re-orders the user data, by re-ordering the user data in accordance with the configured service hopping pattern, whether or not it is pre-defined. The multicast data handler 820 may then discard any excess data that, for example, may not fit in the scheduling period. The discarding of any excess data by the multicast data handler 820 may be performed after the re-ordering operation. The multicast data handler 820 then compiles the scheduling information. In compiling the service hopping scheduling information, the multicast data handler 820 may take into account the transfer of the multicast control information, the user data and the scheduling information using the appropriate radio resources.

In some examples, it is envisaged that the hopping scheme may not only affect the actual values of the service scheduling information, but it may also affect how the actual values are to be used. For example, in cases where the service hopping is performed by modifying the order of the MBMS services that are scheduled, there is no impact upon the handling of the scheduling information. If, however, the service hopping is performed by means of a shift by N subframes that is applied to the MBMS services, there may be some impact. In particular, one of the services may be split; i.e. a subset of the service being located in the initial subframes and a subset of the service located in the final subframes of the scheduling period. One mechanism to handle the scheduling information for such a scheme is to indicate the start of each service not taking the shift into account. In such a case, the UE would apply the circular shift by N subframes to the indicated start position of each service. This way, it is still possible for the scheduling information not to be affected by the circular shift, i.e. even for services that are split, the normal scheduling information can be provided e.g. the start position of the service.

The multicast control layer-3 810 is configured to handle the multicast control information. In a first example embodiment, the multicast control information is terminated in the MCE. If the MCE terminates the information, the eNB transparently passes the information to the UE. However, the eNB also needs to configure its Multicast data handler 820 to apply the appropriate service hopping scheme. In some examples, the appropriate service hopping scheme may either be based on the same control information (i.e. that is forwarded to the UE) or based on additional parameters exchanged between MCE and eNB.

In a second example embodiment, the multicast control information may be terminated in the eNB. If the eNB terminates the multicast control information, the MCE provides the input whilst the eNB compiles the actual RRC control information. The eNB also uses the input from the MCE to configure its Multicast data handler 820 to apply the appropriate service hopping scheme.

In some examples, some or all of the steps illustrated in the message sequence charts of FIG. 6 or FIG. 7 may be implemented in hardware and/or some or all of the steps illustrated in the message sequence charts may be implemented in software. Thus, the hereinbefore examples provide a network entity such as an MCE that is arranged to configure multicast/MBMS services, for example on a MBMS service in an MBSFN service area, based on a service hopping schedule. The use of a service hopping schedule that distributes the use of multicast/MBMS subframes across multiple MBMS services may assist in avoiding conflict between measurement gaps and multicast/MBMS service reception. Although the network entity in the hereinbefore example has been described with reference to an MCE, it is envisaged in other examples that the functionality may be performed in an alternative network entity, such as an MME, or distributed between a number of network entities, such as partly supporting the proposed service hopping concept in an MCE and partly in an MME. The hereinbefore examples also provide an apparatus, such as an eNB, that is adapted to configure broadcast multimedia transmissions according to the aforementioned service hopping schedule. The hereinbefore examples also provide a wireless, communication unit, such as a UE, that is adapted to configure its receiver and processing of broadcast multimedia transmissions according to the aforementioned service hopping schedule. Furthermore, the hereinbefore examples provide associated methods and computer program products comprising code operable for scheduling multicast/MBMS transmissions.

Advantageously, the hereinbefore described examples may avoid a need for additional overhead and delays introduced by additional protection/repair mechanisms at upper layers of the OSI model. Furthermore, examples hereinbefore described may provide additional flexibility for the scheduler in EUTRAN, for example in the MME or MCE.

Figure 10:
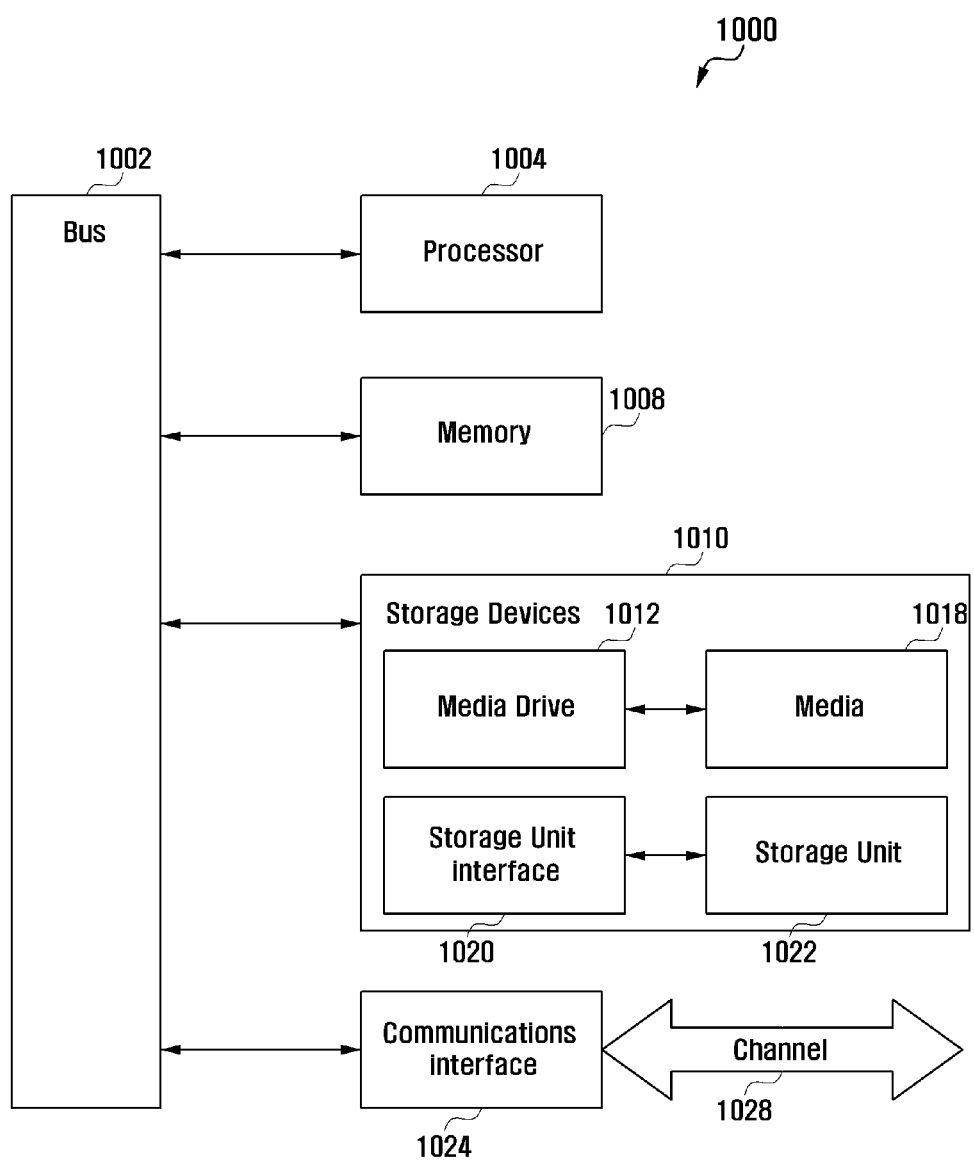
FIG. 10 illustrates a typical computing system that may be employed to implement signal processing functionality in embodiments of the invention.

Referring now to FIG. 10, there is illustrated a typical computing system 1000 that may be employed to implement signal processing functionality in embodiments of the invention. Computing systems of this type may be used in access points and wireless communication units. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control module. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, a radio frequency (RF) link, a network interface, a local or wide area network, and other communications channels.

In this document, the terms 'computer program product' 'computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control module (in this example, software instructions or computer program code), when executed by the processor 1004, causes the processor 1004 to perform the functions of the invention as described herein.

In particular, it is envisaged that the aforementioned inventive concept can be applied by a semiconductor manufacturer to any integrated circuit comprising modules for scheduling MBMS transmissions, for example in a network element, such as an MCE. Similarly, the aforementioned inventive concept can also be applied by a semiconductor manufacturer to any integrated circuit comprising modules for receiving messages comprising scheduling MBMS transmissions, for example in an eNB or a wireless communication unit, such as a UE, arranged to respond to and subsequently receive MBMS communications from such as a network entity. It is further envisaged that, for example, a semiconductor manufacturer may employ the inventive concept in a design of a stand-alone device, or application-specific integrated circuit (ASIC) or any other sub-system element.

It will be appreciated that, for clarity purposes, the above description has described embodiments of the invention with reference to different functional units and processors. However, it will be apparent that any suitable distribution of functionality between different functional units or processors, for example with respect to the signal processing module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved network element, Node B, communication unit and method for scheduling that employs service hopping to prevent systematic conflicts between an MBMS service reception and measurement gaps applicable for a UE have been described, wherein one or more of the aforementioned disadvantages with prior art arrangements may be substantially alleviated.

The invention claimed is:

1. A method for scheduling Multimedia Broadcast and Multicast Service (MBMS) transmissions in radio frames comprising subframes, the method comprising:
   receiving a plurality of different MBMS user data for broadcasting to a plurality of wireless communication units;
   scheduling at least one of the plurality of different MBMS user data of MBMS services in a predetermined order for broadcasting in respective subframes within a first scheduling period; and
   scheduling the at least one of the plurality of different MBMS user data of the MBMS services in the predetermined order to employ a different starting subframe within a second scheduling period,
   wherein scheduling the at least one of the plurality of different MBMS user data of the MBMS services in the predetermined order to employ the different starting subframe within the second scheduling period comprises scheduling a plurality of MBMS services of which a same MBMS service is a subset thereof according to a predefined service hopping pattern.

2. The method for scheduling MBMS transmissions of claim 1, wherein scheduling the at least one of the plurality of different MBMS user data of the MBMS services in the predetermined order to employ the different starting subframe within the second scheduling period comprises scheduling the at least one of the plurality of different MBMS user data of the MBMS services to employ the different starting subframe based on the MBMS service to be broadcast.

3. The method for scheduling MBMS transmissions of claim 1, wherein scheduling the at least one of the plurality of different MBMS user data of the MBMS services in the predetermined order to employ the different starting subframe within the second scheduling period comprises scheduling according to at least one of:
   shifting the starting subframe for the same MBMS service; and
   re-positioning one or more of the subframes for the same MBMS service within the second scheduling period.

4. The method for scheduling MBMS transmissions of claim 1, further comprising initially determining whether to implement a service hopping pattern to be used in delivering multimedia services and selectively scheduling the MBMS service in response to a positive determination.

5. The method for scheduling MBMS transmissions of claim 1, wherein the predefined service hopping pattern is a priori known to the plurality of wireless communication units.

6. The method for scheduling MBMS transmissions of claim 1, further comprising signaling to a broadcast network element and the plurality of wireless communication units the predefined service hopping pattern that is to be used in delivering multimedia services.

7. The method for scheduling MBMS transmissions of claim 6, wherein signaling to the plurality of wireless communication units comprises signaling the predefined service hopping pattern to the plurality of wireless communication units in a radio resource control message on a MBMS control channel.

8. The method for scheduling MBMS transmissions of claim 6, wherein signaling to the broadcast network element comprises signaling the pre-defined pattern to the broadcast network element upon a re-configuration of the predefined service hopping pattern.

9. The method for scheduling MBMS transmissions of claim 6, wherein signaling to the plurality of wireless communication units comprises at least one of:
- signaling the predefined service hopping pattern to the plurality of wireless communication units information at the start of each scheduling period, thereby indicating a position of a respective MBMS service that is scheduled during the scheduling period; and
- signaling periodically the predefined service hopping pattern to the plurality of wireless communication units information as part of multicast broadcast single frequency network control information.

10. The method for scheduling MBMS transmissions of claim 1, wherein the scheduling of the at least one of the plurality of different MBMS user data of the MBMS services in the predetermined order to employ the different starting subframe is performed using at least one of changing a starting position of user data according to a service hopping schedule of MBMS services in a round robin approach, changing a starting position of the user data according to the service hopping schedule of MBMS services within a group round robin approach, and shifting a start position of each MBMS service within respective scheduling periods.

11. The method for scheduling MBMS transmissions of claim 1, further comprising indicating that the different starting subframe for the same MBMS service is to be used for broadcasting in respective subframes within the second scheduling period by adopting at least one of:
- allocating a field on a control channel as being optional, such that service hopping is applied if the field is determined as being present on a signaling channel; and
- assigning at least one bit on a signaling channel.

12. The method for scheduling MBMS transmissions of claim 11, further comprising indicating that the different starting subframe for the same MBMS service is to be used by assigning the at least one bit in a particular field on the signaling channel.

13. The method for scheduling MBMS transmissions of claim 1, further comprising sending a MBMS session start message to a broadcast network element to indicate a start of multimedia content delivery and supplementing the MBMS session start message with a service hopping pattern according to the different starting subframe within the second scheduling period.

14. The method for scheduling MBMS transmissions of claim 1, wherein the subframes allocated for the same MBMS service for a wireless communication unit are arranged to not be consistently time-coincident with subframes allocated to the same wireless communication unit for performing radio frequency signal measurements.

15. A non-transitory computer-readable recording medium having recorded thereon a computer program for executing a method of scheduling Multimedia Broadcast and Multicast Service (MBMS) transmissions in radio frames comprising subframes, the computer program, which when executed by a processor, performs method steps of:
- receiving a plurality of different MBMS user data for broadcasting to a plurality of wireless communication units,
- scheduling at least one of the plurality of different MBMS user data of MBMS services in a predetermined order for broadcasting in respective subframes within a first scheduling period, and
- scheduling at least one of the plurality of different MBMS user data of MBMS services in a predetermined order to employ a different starting subframe for a same MBMS service for broadcasting in respective subframes within a second scheduling period, wherein scheduling the at least one of the plurality of different MBMS user data of the MBMS services in the predetermined order to employ the different starting subframe for the same MBMS service within the second scheduling period comprises scheduling a plurality of MBMS services of which the MBMS service is a subset thereof according to a predefined service hopping pattern.

16. A network entity for scheduling Multimedia Broadcast and Multicast Service (MBMS) transmissions in radio frames comprising subframes, the network entity comprising:
- a receiver to receive a plurality of different MBMS user data for broadcasting to a plurality of wireless communication units;
- a controller configured to control to schedule at least one of the plurality of different MBMS user data of MBMS services in a predetermined order for broadcasting in respective subframes within a first scheduling period, and schedule the at least one of the plurality of different MBMS user data of MBMS services in a predetermined order for a same MBMS service to employ a different starting subframe within a second scheduling period,
- wherein scheduling the at least one of the plurality of different MBMS user data of the MBMS services in the predetermined order for the same MBMS service to employ the different starting subframe within the second scheduling period comprises scheduling a plurality of MBMS services of which the MBMS service is a subset thereof according to a predefined service hopping pattern.

17. The network entity of claim 16, wherein the network entity is a Multi-cell/multicast Coordination Entity (MCE).

* * * * *